(12) United States Patent
Araki

(10) Patent No.: US 10,244,130 B2
(45) Date of Patent: Mar. 26, 2019

(54) INFORMATION PROCESSING APPARATUS AND INFORMATION PROCESSING METHOD

(71) Applicant: Ryoji Araki, Fukuoka (JP)

(72) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/667,805

(22) Filed: Aug. 3, 2017

(65) Prior Publication Data

US 2018/0048773 A1 Feb. 15, 2018

(30) Foreign Application Priority Data

Aug. 10, 2016 (JP) ................. 2016-157113

(51) Int. Cl.
| | |
|---|---|
| *H04N 1/00* | (2006.01) |
| *G06F 3/0481* | (2013.01) |
| *G06F 9/46* | (2006.01) |
| *G06F 21/31* | (2013.01) |
| *H04L 29/06* | (2006.01) |
| *G06F 21/60* | (2013.01) |
| *G06F 9/451* | (2018.01) |

(52) U.S. Cl.
CPC ....... *H04N 1/00244* (2013.01); *G06F 3/0481* (2013.01); *G06F 9/468* (2013.01); *G06F 21/31* (2013.01); *G06F 21/608* (2013.01); *H04L 63/0807* (2013.01); *H04N 1/0035* (2013.01); *H04N 1/0083* (2013.01); *H04N 1/00392* (2013.01); *H04N 1/00411* (2013.01); *H04N 1/00474* (2013.01); *H04N 1/00941* (2013.01); *G06F 9/451* (2018.02); *G09G 2340/14* (2013.01); *H04N 2201/0094* (2013.01)

(58) Field of Classification Search
CPC .......................... G06F 3/0481; H04N 1/00244
See application file for complete search history.

(56) References Cited

U.S. PATENT DOCUMENTS

| | | | |
|---|---|---|---|
| 6,211,797 B1 * | 4/2001 | Kimura ................. | H04B 10/11 340/3.1 |
| 8,264,717 B2 | 9/2012 | Araki | |
| 8,474,051 B2 | 6/2013 | Araki | |
| 8,488,135 B2 | 7/2013 | Shimizu et al. | |

(Continued)

FOREIGN PATENT DOCUMENTS

| | | |
|---|---|---|
| JP | 2014-219759 | 11/2014 |
| JP | 2016-130902 | 7/2016 |

OTHER PUBLICATIONS

U.S. Appl. No. 15/480,563, filed Apr. 6, 2017.

*Primary Examiner* — Ibrahim Siddo
(74) *Attorney, Agent, or Firm* — IPUSA, PLLC

(57) ABSTRACT

An information processing apparatus is provided that includes an operation unit implemented by an information processing terminal connected via a communication line. The information processing apparatus includes a memory storing a program and a processor configured to execute the program to implement processes of opening a port for receiving a packet conforming to a predetermined communication protocol in response to a request from the information processing terminal, and transmitting data included in the packet to the information processing terminal in response to receiving the packet that is directed to the port.

15 Claims, 8 Drawing Sheets

(56) References Cited

U.S. PATENT DOCUMENTS

| | | |
|---|---|---|
| 8,767,244 B2 | 7/2014 | Araki |
| 8,982,386 B2 | 3/2015 | Araki |
| 9,195,976 B2 | 11/2015 | Araki |
| 9,218,224 B2 | 12/2015 | Araki |
| 9,261,947 B2 | 2/2016 | Araki |
| 9,286,048 B2 | 3/2016 | Araki |
| 9,286,141 B2 | 3/2016 | Araki |
| 9,307,108 B2 | 4/2016 | Araki |
| 9,323,478 B2 | 4/2016 | Araki |
| 9,323,917 B2 | 4/2016 | Araki |
| 2008/0126653 A1* | 5/2008 | King ................. H04L 67/02 710/300 |
| 2013/0258385 A1 | 10/2013 | Shimizu et al. |
| 2016/0014113 A1 | 1/2016 | Akiyoshi et al. |
| 2016/0044200 A1 | 2/2016 | Araki et al. |
| 2016/0065756 A1 | 3/2016 | Araki et al. |
| 2016/0119281 A1* | 4/2016 | Tanaka ................. H04W 4/70 370/392 |
| 2016/0203033 A1 | 7/2016 | Araki |
| 2016/0205277 A1 | 7/2016 | Araki |
| 2016/0275282 A1 | 9/2016 | Araki |
| 2017/0161048 A1 | 6/2017 | Araki |

* cited by examiner

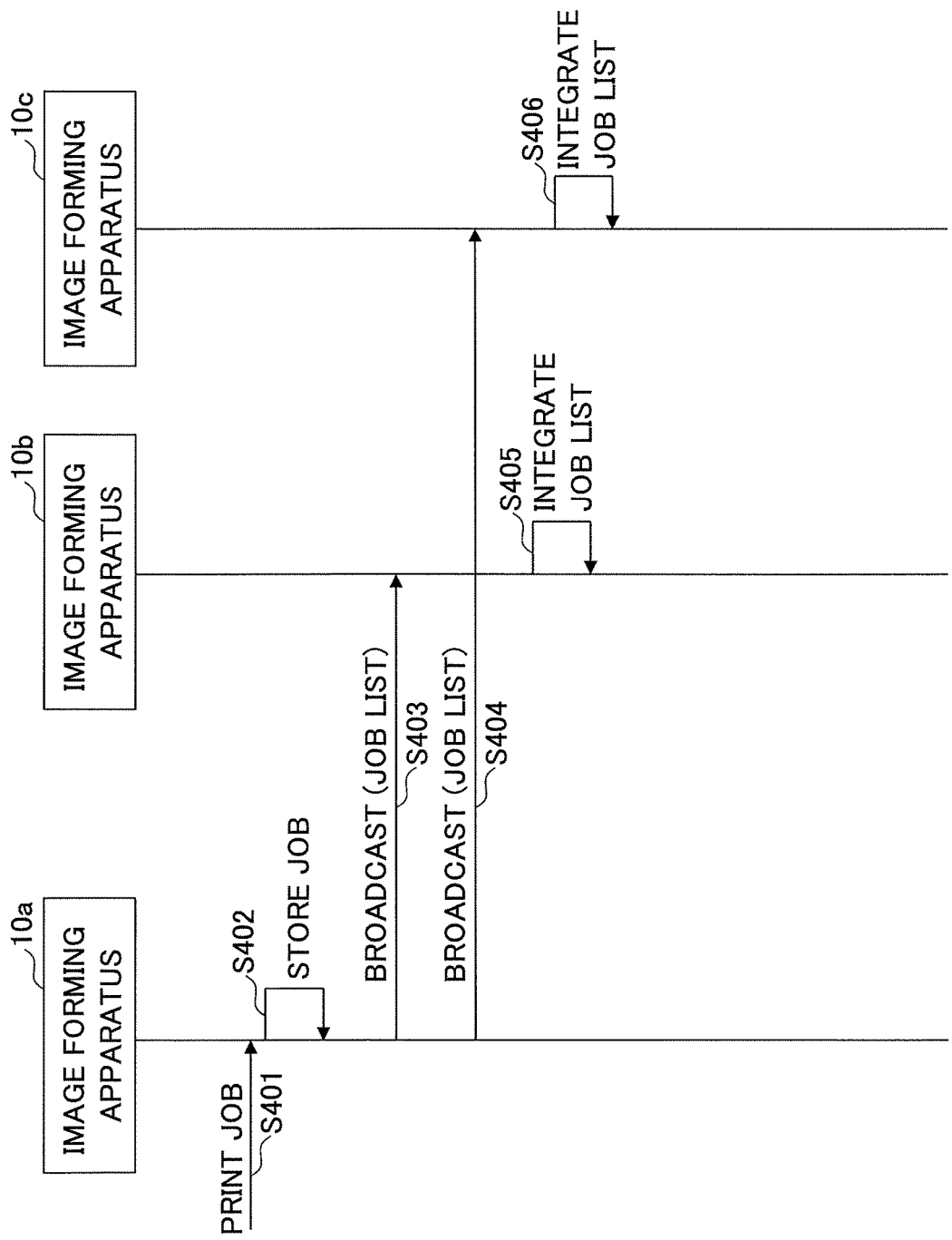

INFORMATION PROCESSING APPARATUS AND INFORMATION PROCESSING METHOD

CROSS-REFERENCE TO RELATED APPLICATIONS

The present application claims priority under 35 U.S.C. § 119 to Japanese Patent Application No. 2016-157113 filed on Aug. 10, 2016, the entire contents of which are incorporated herein by reference.

BACKGROUND OF THE INVENTION

1. Field of the Invention

The present invention relates to an information processing apparatus and an information processing method.

2. Description of the Related Art

In view of the popularity of smart terminals such as smartphones, there are electronic appliances, office equipment, and other devices that can cooperate with smart terminals. For example, there are devices (e.g., multifunction peripherals) that have smart terminals functioning as operation panels of the devices.

Note that a smart terminal has its own OS (Operating System). Thus, when a smart terminal is used as an operation panel of a device, an application program (hereinafter simply referred to as "application") is installed in the smart device as well as the device.

An application installed in a smart terminal that functions as an operation panel of a device may be capable of communicating with some other external device. Communication between such application and the external device may be easily established using a wireless communication function of the smart terminal, for example.

However, the device may not necessarily be installed in a wireless LAN (local area network) communication environment, for example.

SUMMARY OF THE INVENTION

According to one embodiment of the present invention, an information processing apparatus is provided that includes an operation unit implemented by an information processing terminal connected via a communication line. The information processing apparatus includes a memory storing a program and a processor configured to execute the program to implement processes of opening a port for receiving a packet conforming to a predetermined communication protocol in response to a request from the information processing terminal, and transmitting data included in the packet to the information processing terminal in response to receiving the packet that is directed to the port.

BRIEF DESCRIPTION OF THE DRAWINGS

FIG. 8 is a sequence chart illustrating process operations executed by the image forming apparatus according to a fourth example.

DESCRIPTION OF THE EMBODIMENTS

Note that an application of an information terminal functioning as an operation unit of a device may not be able to establish communication with some other external device using a wireless communication function of the information processing terminal when the device is not installed in a wireless LAN (Local Area Network) communication environment, for example. Also, requiring a customer using the device to subscribe to a mobile communication network service for the purpose of accommodating the communication function of the application of the information processing terminal provided as the operation unit may adversely affect the marketability and competitive edge of the device.

In this respect, an aspect of the present invention is directed to enabling an information processing terminal functioning as an operation unit to establish communication using an existing communication path.

In the following, embodiments of the present invention are described with reference to the accompanying drawings.

Figure 1:
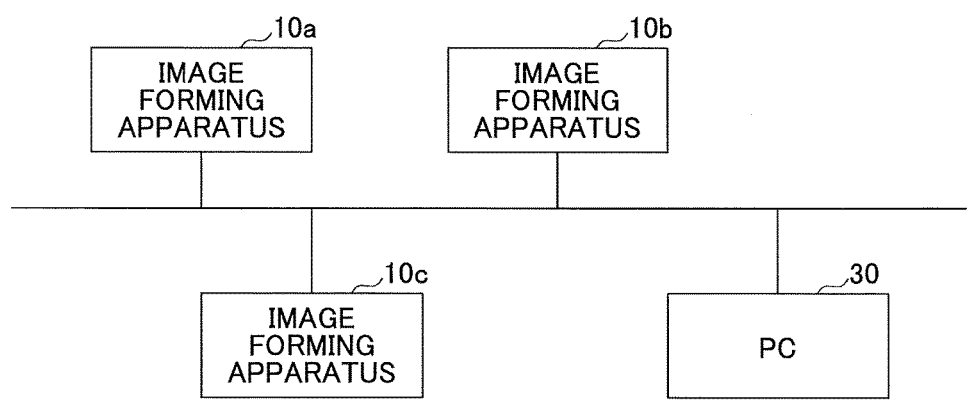
FIG. 1 is a diagram illustrating an example network configuration according to an embodiment of the present invention.

FIG. 1 is a diagram illustrating an example network configuration according to an embodiment of the present invention. In FIG. 1, an image forming apparatus 10a, an image forming apparatus 10b, an image forming apparatus 10c (hereinafter simply referred to as "image forming apparatus 10" unless they are distinguished from one another other), and a PC (personal computer) 30 are connected to each other via a network, such as a LAN (local area network) or the Internet.

In the present embodiment, the image forming apparatus 10 is an MFP (multifunction peripheral) that can implement two or more functions, such as printing, scanning, copying, and/or facsimile transmission within a single housing. However, the image forming apparatus 10 may also be a device implementing one of the above functions within a single housing, for example.

The PC 30 may be a general personal computer, for example.

Figure 2:
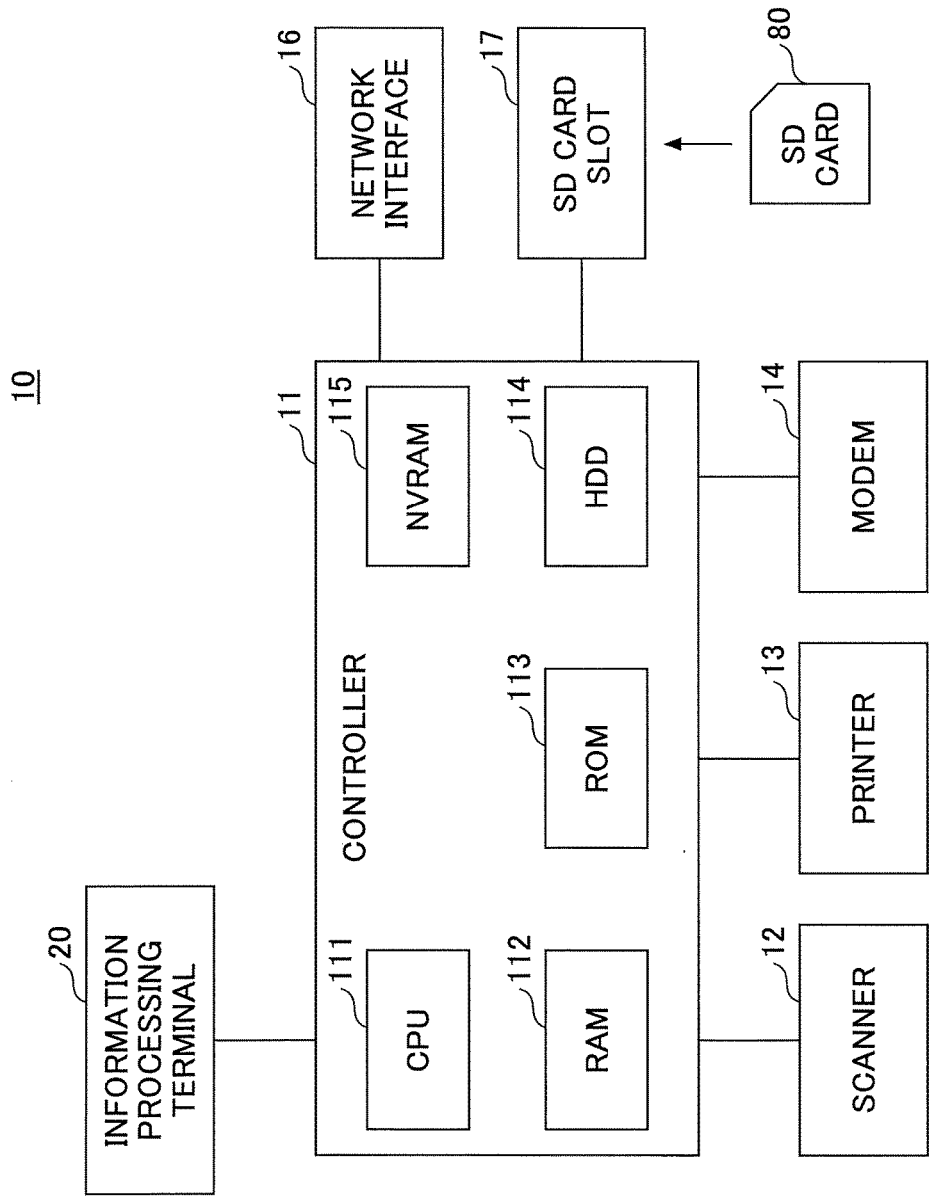
FIG. 2 is a diagram illustrating an example hardware configuration of an image forming apparatus according to an embodiment of the present invention.

FIG. 2 is a diagram illustrating an example hardware configuration of the image forming apparatus 10 according to the present embodiment. In FIG. 2, the image forming apparatus 10 includes hardware elements, such as a controller 11, a scanner 12, a printer 13, a modem 14, a network interface 16, and an SD card slot 17.

The controller 11 is a computer (information processing apparatus) installed in the main unit of the image forming apparatus 10. In FIG. 2, the controller 11 includes a CPU 111, a RAM 112, a ROM 113, an HDD 114, and an NVRAM 115. The ROM 113 stores various programs and data used by these programs. The RAM 112 is used as a storage area for loading a program and a work area for the loaded program, for example. The CPU 111 implements various functions by processing a program loaded in the RAM 112. The HDD 114 stores programs and various data used by the programs. The NVRAM 115 stores various setting information, for example.

The scanner 12 is hardware (image scanning unit) for scanning a document to obtain image data of the document. The printer 13 is hardware (printing unit) for printing print data on a print medium, such as paper. The modem 14 is hardware for establishing connection with a telephone line and is used for transmission and reception of image data by facsimile communication. The network interface 16 is hardware for establishing connection with a network, such as a LAN (wired or wireless). The SD card slot 17 is used for reading a program stored in an SD card 80. That is, the image forming apparatus 10 can load a program stored in the SD card 80 into the RAM 112 and execute the program in addition to loading and executing a program stored in the ROM 113. Also, note that the SD card 80 can be replaced by some other type of recording medium (e.g., a CD-ROM or a USB (Universal Serial Bus) memory). That is, the recording medium to be used as the SD card 80 is not limited to a predetermined type of recording medium. Further, the SD card slot 17 may be replaced by hardware corresponding to the type of the recording medium used.

The information processing terminal 20 is connected to the controller 11 via a communication line. The information processing terminal 20 may be a device, such as a smartphone or a tablet terminal, for example. The information processing terminal 20 is an electronic device that is capable of independently executing a complete information processing operation. In the present embodiment, the information processing terminal 20 functions as an operation unit of the image forming apparatus 10. More specifically, the information processing terminal 20 is connected to the controller 11 to be used in place of an operation panel that is typically provided as an operation unit dedicated to the image forming apparatus 10. The controller 11 and the information processing terminal 20 are connected via a communication line, such as a USB cable, short-range wireless communication, or a LAN. For example, the information processing terminal 20 may be a portable communication terminal, such as a smartphone, a tablet terminal, or some other electronic device that is capable of communicating with the image forming apparatus 10 via short-range wireless communication and is capable of independently executing a complete information processing operation. Note that the term "smartphone" refers to a multi-function terminal having a communication function of a mobile phone as well as other various functions, such as an image capturing function of a camera and a web information display function of a PC, for example. The term "tablet terminal" refers to a multi-function terminal in the form of a tablet that has functions similar to those provided in a smartphone.

Figure 3:
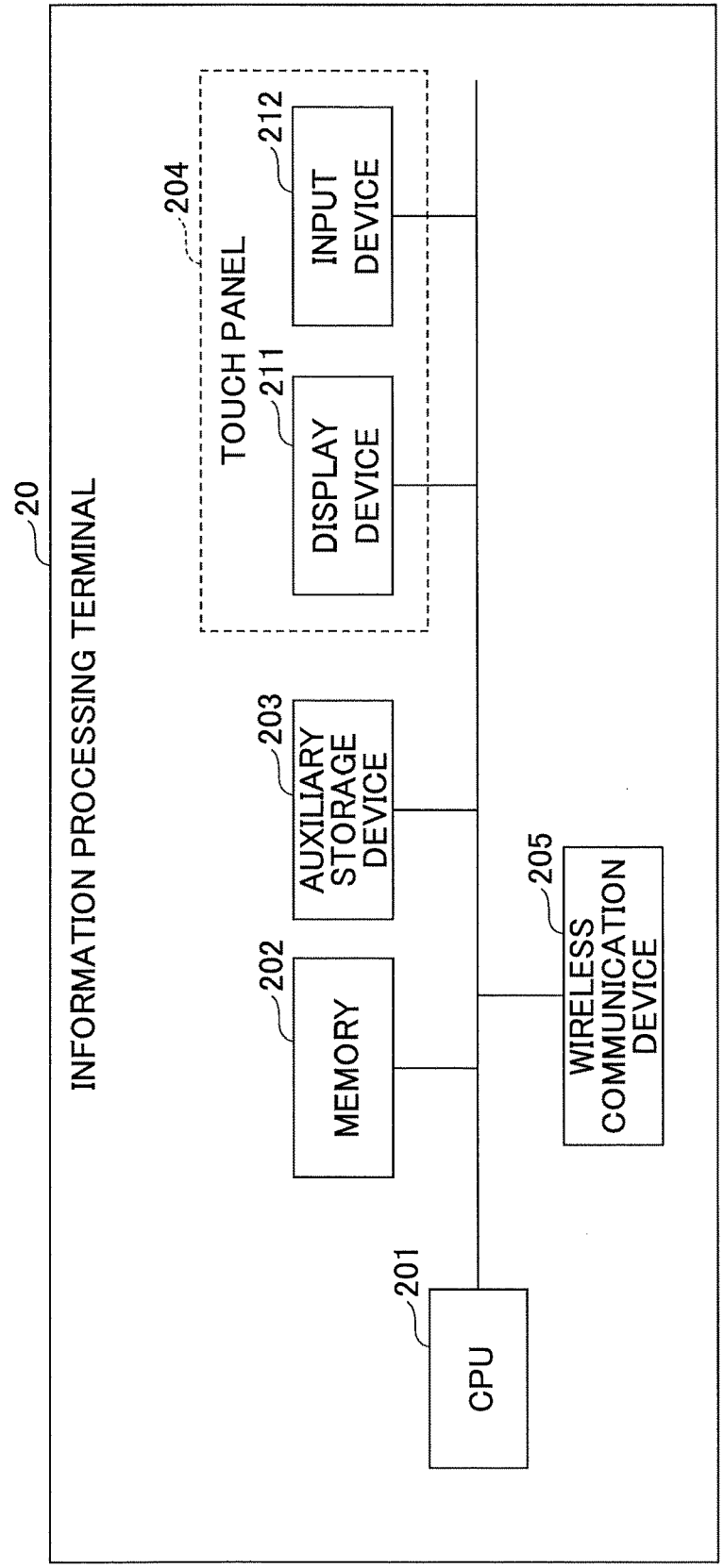
FIG. 3 is a diagram illustrating an example hardware configuration of an information processing terminal according to an embodiment of the present invention.

FIG. 3 is a diagram illustrating an example hardware configuration of the information processing terminal 20 according to an embodiment of the present invention. In FIG. 3, the information processing terminal 20 includes a CPU 201, a memory 202, an auxiliary storage device 203, a touch panel 204, and a wireless communication device 205.

The auxiliary storage device 203 stores programs installed in the information processing terminal 20. The memory 202 reads a program from the auxiliary storage device 203 and stores the program in response to an instruction to activate the program. The CPU 201 implements functions of the information processing terminal 20 by executing the programs stored in the memory 202.

The touch panel 204 is an electronic component having both an input function and a display function and is configured to display information and accept input operations from a user, for example. The touch panel 204 includes a display device 211 and an input device 212.

The display device 211 implements the display function of the touch panel 204 and may be a liquid crystal display, for example. The input device 212 is an electronic component including a sensor that detects contact of a contacting object that comes into contact with the display device 211. Note that the method used to detect the contact of the contacting object may be any known method, such as an electrostatic method, a resistive film method, or an optical method, for example. Also, note that the contacting object is an object that comes into contact with a contact surface (surface) of the touch panel 204. Examples of such an object include a user's finger or a dedicated or general pen.

The wireless communication device 205 is an electronic component, such as an antenna, that is required for establishing communication in a wireless LAN (Local Area Network) or a mobile communication network, for example. Note, however, that the information processing terminal 20 according to the present embodiment does not necessarily have to include the wireless communication device 205.

Figure 4:
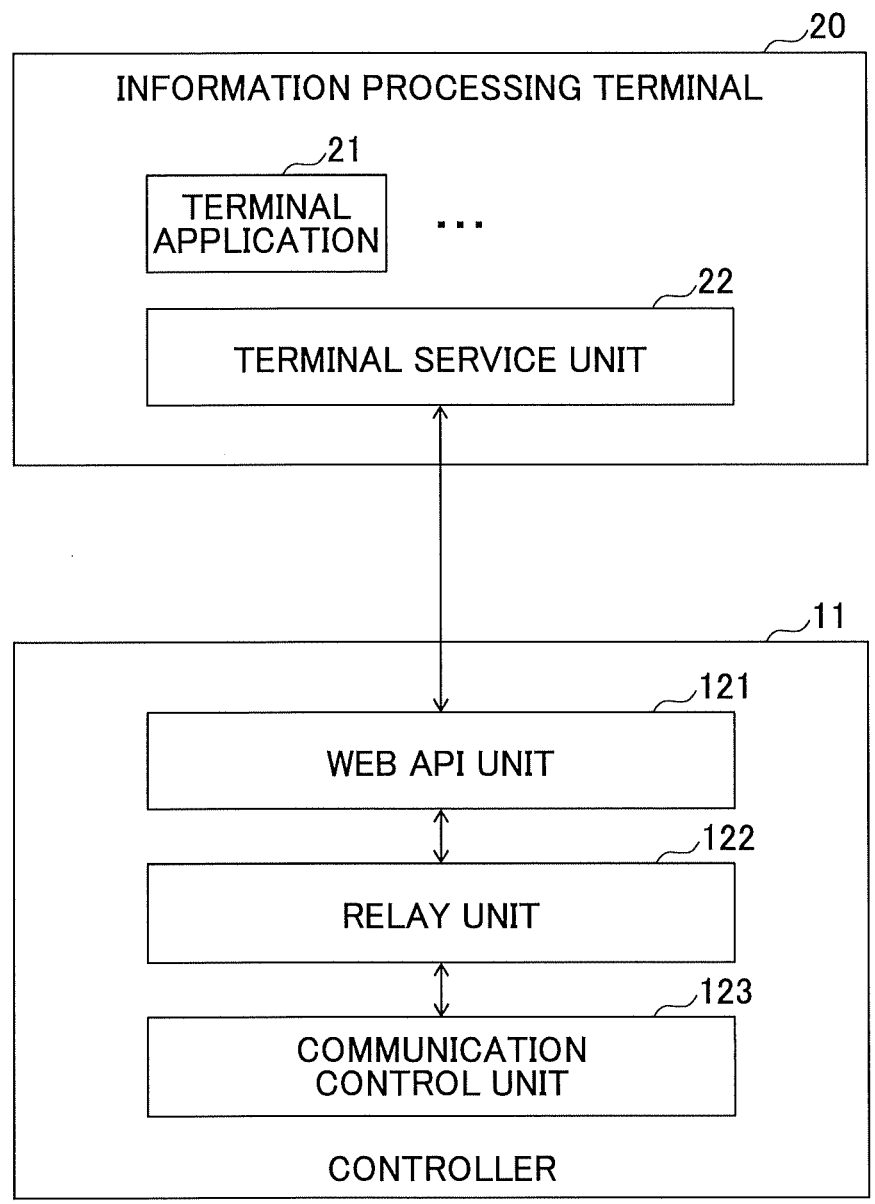
FIG. 4 is a diagram illustrating an example functional configuration of the image forming apparatus according to an embodiment of the present invention.

FIG. 4 is a diagram illustrating an example functional configuration of the image forming apparatus 10 according to an embodiment of the present invention. In FIG. 4, the controller 11 includes a web API unit 121, a relay unit 122, and a communication control unit 123. Each of these units may be implemented by the CPU 11 executing a process based on one or more programs installed in the controller 11, for example.

The web API unit 121 provides a web API to program units, such as a terminal application 21 and a terminal service unit 22 of the information processing terminal 20. Note that a web API refers to a web-based API (Application Program Interface). For example, the web API unit 121 may provide an API for receiving an HTTP (HyperText Transfer Protocol) request and returning an HTTP response.

Note that in the present embodiment, web APIs relating to communication, such as requests for opening a port or closing a port, are mainly described. However, web APIs for accepting requests other than those relating to communication may also be provided. For example, a web API may be provided for accepting a print execution request, a scan execution request, or some other request for using hardware resources of the controller 11.

The relay unit 122 executes process operations for relaying communication between the information processing terminal 20 and an external device. For example, in response to receiving a port open request from the information processing terminal 20, the relay unit 122 may request the communication control unit 123 to open a port for receiving a packet (port for server). The relay unit 122 may also receive a data transmission request from the information processing terminal 20 to transmit data to a port opened by the image forming apparatus 10 or the PC 30 and request the communication control unit 123 to transmit the data in response to the data transmission request. The relay unit 122 may also receive a packet directed to a port and transmit the data included in the packet to the information processing terminal 20. Further, in response to receiving a port close request from the information processing terminal 20, the relay unit 122 may request the communication control unit 123 to close a port that is open.

The communication control unit 123 is run on the OS (Operating System) of the controller 11 and controls communication of the controller 11.

The information processing terminal 20 includes one or more terminal applications 21 and the terminal service unit 22. Each of these units may be implemented by the CPU 201 executing a process based on one or more programs installed in the information processing terminal 20.

The terminal application 21 is an application program (hereinafter simply referred to as "application") installed in the information processing terminal 20. In the present embodiment, the terminal application 21 is an application that provides a predetermined service to a user using UDP (User Datagram Protocol) communication. For example, the terminal application 21 may use UDP to establish communication with another image forming apparatus 10 or the PC 30 through broadcast or multicast.

The terminal service unit 22 functions as an application platform for the terminal application 21. In the present embodiment, the web API provided by the Web API unit 121 is wrapped in a predetermined programming language, and the terminal service unit 22 provides the wrapped web AIP to the terminal application 21. However, in other embodiments, the terminal application 21 may directly call the web API provided by the Web API unit 121.

Figure 5:
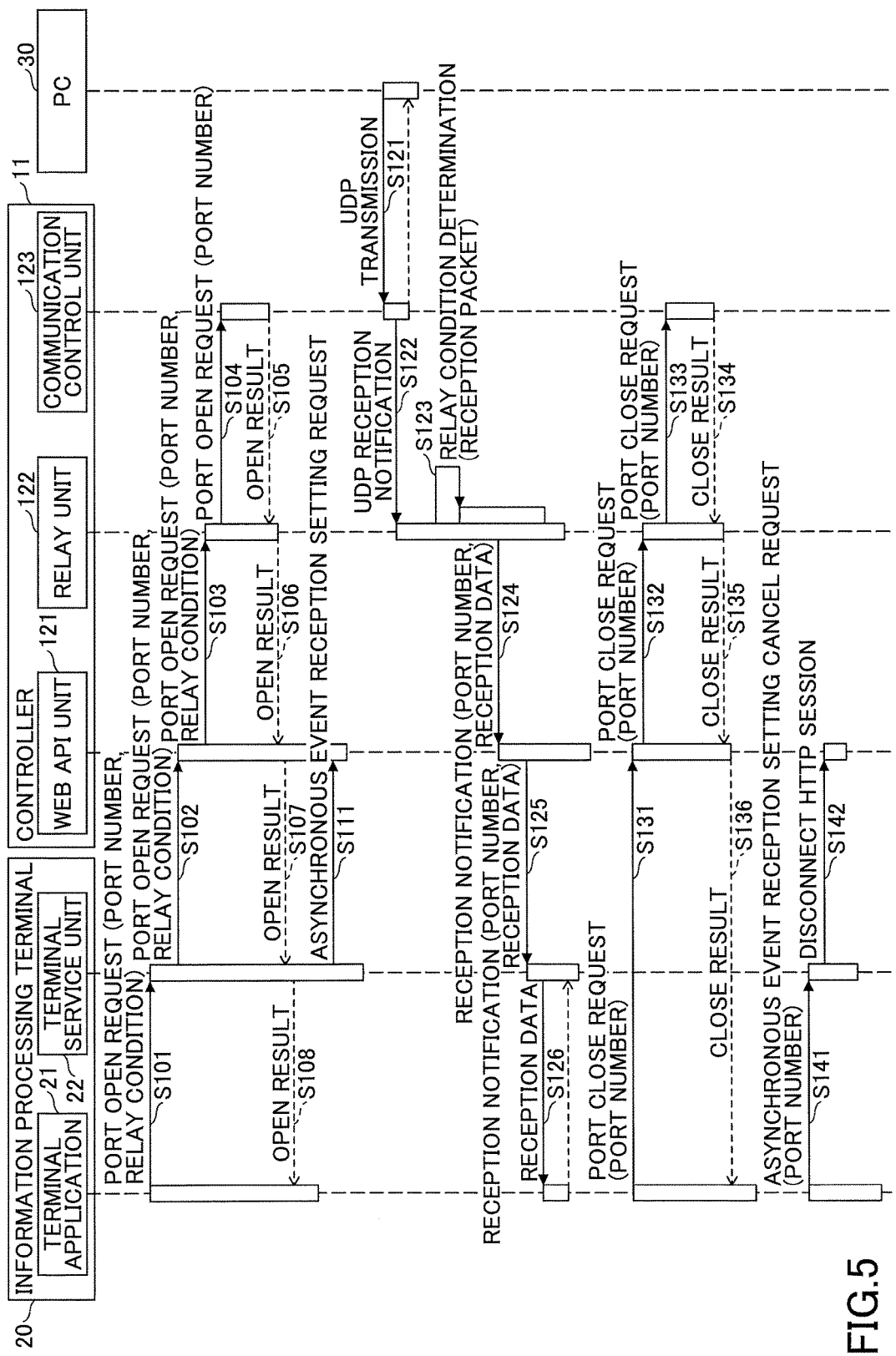
FIG. 5 is a sequence chart illustrating process operations executed by the image forming apparatus according to a first example.

In the following, process operations executed by the image forming apparatus 10 will be described. FIG. 5 is a sequence chart illustrating process operations executed by the image forming apparatus 10 according to a first example embodiment of the present invention.

The terminal application 21 that seeks to receive a UDP packet from an external source inputs a port open request for opening a UDP reception port to the terminal service unit 22 (step S101). The port open request specifies a port number (hereinafter referred to as "target port number") and a relay condition. The port number is identification information of each UDP port. The relay condition is a condition for determining whether a packet directed to the UDP port can be relayed to the terminal application 21. That is, the relay condition is specified in order to prevent an unauthorized packet from being relayed to the information processing terminal 20. For example, the relay condition may specify a transmission source IP address from which packet relay is allowed/prohibited or a transmission source port number from which packet relay is allowed/prohibited. Alternatively, the relay condition may require a predetermined value to be included at a predetermined position of data included in the packet.

Then, the terminal service unit 22 transmits the port open request (HTTP request) from the terminal application 21 to the Web API unit 121 (step S102). The port open request is transmitted to the web API unit 121 by calling a web API (function or method) corresponding to a packet release request that is provided by the Web API unit 121.

Upon receiving the port open request, the web API unit 121 transmits the port open request to the relay unit 122 (step S103). In turn, the relay unit 122 requests the communication control unit 123 to open the port with the target port number specified in the port open request (step S104). The communication control unit 123 executes an opening process for opening the port with the target port number (hereinafter referred to as "target port") and returns an open result corresponding to information indicating the result of the opening process (success or failure of opening process) to the relay unit 122 (step S105). When the open result indicates that the opening process has been successful, the relay unit 122 stores the target port number and the relay condition transmitted together with the target port number in association with each other in the RAM 112, for example. Then, the relay unit 122 transmits the open result to the web API unit 121 (step S106). In turn, the web API unit 121 transmits a response (HTTP response) including the open result to the terminal service unit 22 (step S107).

When the open result indicates that the opening process has been successful, the terminal service unit 22 stores identification information of the terminal application 21 (hereinafter referred to as "application ID") corresponding to the sender of the UDP port open request in association with the target port number in the memory 202. Then, the terminal service unit 22 transmits the open result to the terminal application 21 corresponding to the sender of the UDP port open request (step S108).

The terminal service unit 22 further transmits an asynchronous event reception setting request to the web API unit 121 (step S111). An asynchronous event refers to an event occurring at the controller 11 irrespective of (asynchronously with) a request from the information processing terminal 20. In the present embodiment, communication between the information processing terminal 20 (the terminal application 21 or the terminal service unit 22) and the controller 11 (the web API unit 121) is established by HTTP, where the controller 11 corresponds to the server side and the information processing terminal 20 corresponds to the client side. As such, basically, the controller 11 can only transmit information to the information processing terminal 20 in the form of a response to a request from the information processing terminal 20. However, reception of a packet is an asynchronous event that occurs asynchronously with a request from the information processing terminal 20. Accordingly, the asynchronous event reception setting request is issued in order to enable content of a packet to be promptly transmitted to the information processing terminal 20 in response to the reception of the packet.

The asynchronous event reception setting request may be transmitted by a GET request, for example. Upon receiving the GET request, the web API unit 121 withholds a response to the GET request. Thus, the connection status of the HTTP session for the GET request (hereinafter referred to as "asynchronous event session") is maintained. As a result, the web API unit 121 can transmit the asynchronous event to the terminal service unit 22 at an arbitrary timing.

Then, for example, when the PC 30 transmits a UDP packet addressed to the target port number (step S121), the UDP packet is received at the target port. In turn, the communication control unit 123 notifies the relay unit 122 that the packet has been received at the target port (step S122). At this time, even when a plurality of reception ports are open, the relay unit 122 can recognize the port number associated with the target port because the relay unit 122 has requested the communication control unit 123 to open each of the reception ports.

In response to receiving the notification, the relay unit 122 determines whether relay of the packet is allowed based on the relay condition (step S123). Note that the relay condition referred to in the determination of step S123 is stored in the RAM 112 in association with the target port number.

When the relay of the packet is not allowed, the relay unit 122 discards the packet. On the other hand, when the relay of the packet is allowed, the relay unit 122 transmits a reception notification including the target port number and the reception data (payload) included in the packet to the web API unit 121 (step S124). In turn, the web API unit 121 transmits the reception notification to the terminal service unit 22 using the asynchronous event session (step S125).

Upon receiving the reception notification, the terminal service unit 22 determines the application ID stored in the memory 202 in association with the port number included in the reception notification. Then, the terminal service unit 22 transmits the reception data included in the reception notification to the terminal application 21 that is identified by the application ID (step S126). As a result, the terminal application 21 can execute a process using the reception data included in the UDP packet from an external source.

Thereafter, when the target port is no longer necessary, the terminal application 21 designates the target port number and transmits a port close request to the web API unit 121 to close the target port (step S131). That is, the terminal application 21 can also call the web API.

The web API unit 121 transmits the port close request to the relay unit 122 (step S132). The relay unit 122 requests the communication control unit 123 to close the target port associated with the target port number included in the port close request (step S133). In response, the communication control unit 123 performs a closing process for closing the target port and returns a close result including information indicating the result of the closing process (success or failure of the closing process) to the relay unit 122 (step S134). When the close result indicates that the closing process has been successful, the relay unit 122 deletes the target port number and the relay condition associated with the target port number from the RAM 112. Then, the relay unit 122 notifies the web API unit 121 of the close result (step S135). In turn, the web API unit 121 transmits the close result to the terminal application 21 corresponding to the sender of the port close request (step S136).

When the close result indicates that the closing process has been successful, the terminal application 21 designates the target port number and requests the terminal service unit 22 to cancel the asynchronous event reception setting (step S141). In response to the request, the terminal service unit 22 deletes the combination of the target port number and the application ID associated with the target port number from the memory 202. As a result, if no other combination of a port number and an application ID is stored in the memory 202, the terminal service unit 22 disconnects the asynchronous event session (step S142).

That is, a plurality of ports may be opened as a result of one terminal application 21 executing the processes of steps S101 to S108 a plurality of times for different port numbers or a plurality of terminal applications 21 executing the processes of steps S101 to S108, for example. In this case, a combination of a port number and an application ID for each port that has been opened is stored in the memory 202, for example. When all these ports are closed, the asynchronous event session is disconnected. Note that one asynchronous session may be used for a plurality of ports. That is, step S111 does not have to be performed with respect to each port that has been opened but may only be performed once with respect to a plurality of ports.

As described above, according to the first example embodiment, communication by the information processing terminal 20 is relayed by the controller 11. Thus, a communication path of an existing network to which the controller 11 is connected may be used to enable communication by the information processing terminal 20 functioning as the operation unit (operation panel 15) of the image forming apparatus 10.

By having the controller 11 relay communication by the information processing terminal 20, security of the information processing terminal 20 can be improved, particularly with respect to protocols used for DoS (Denial of Services) attacks, such as UDP. In this case, increased load on the controller 11 may be a concern, but by limiting the packets to be relayed by designating the relay condition, such an increase in load may be controlled, for example.

Also, communication between the information processing terminal 20 and the controller 11 is performed based on a web API with low dependence on a specific communication protocol. Thus, for example, the terminal application 21 of the information processing terminal 20 may be able to use a communication protocol supported by the controller 11 even if the communication protocol is not supported by the information processing terminal 20.

Note that the relay condition may include an automatic response setting to transmit an automatic response with respect to a specific packet, for example. In this case, the relay condition may include a condition indicating the specific packet and information to be included in the automatic response. When a packet corresponding to the specific packet is received, the relay unit 122 transmits a response to the packet via the communication control unit 123 without transmitting the reception data included in the packet to the terminal service unit 22 via the asynchronous event session.

In the following, a second example embodiment of the present invention will be described. Note that the following description of the second example embodiment relates to features that differ from those of the first example embodiment. Thus, it may be assumed that features of the second example embodiment that are not particularly mentioned below may be substantially identical to those of the first example embodiment.

Figure 6:
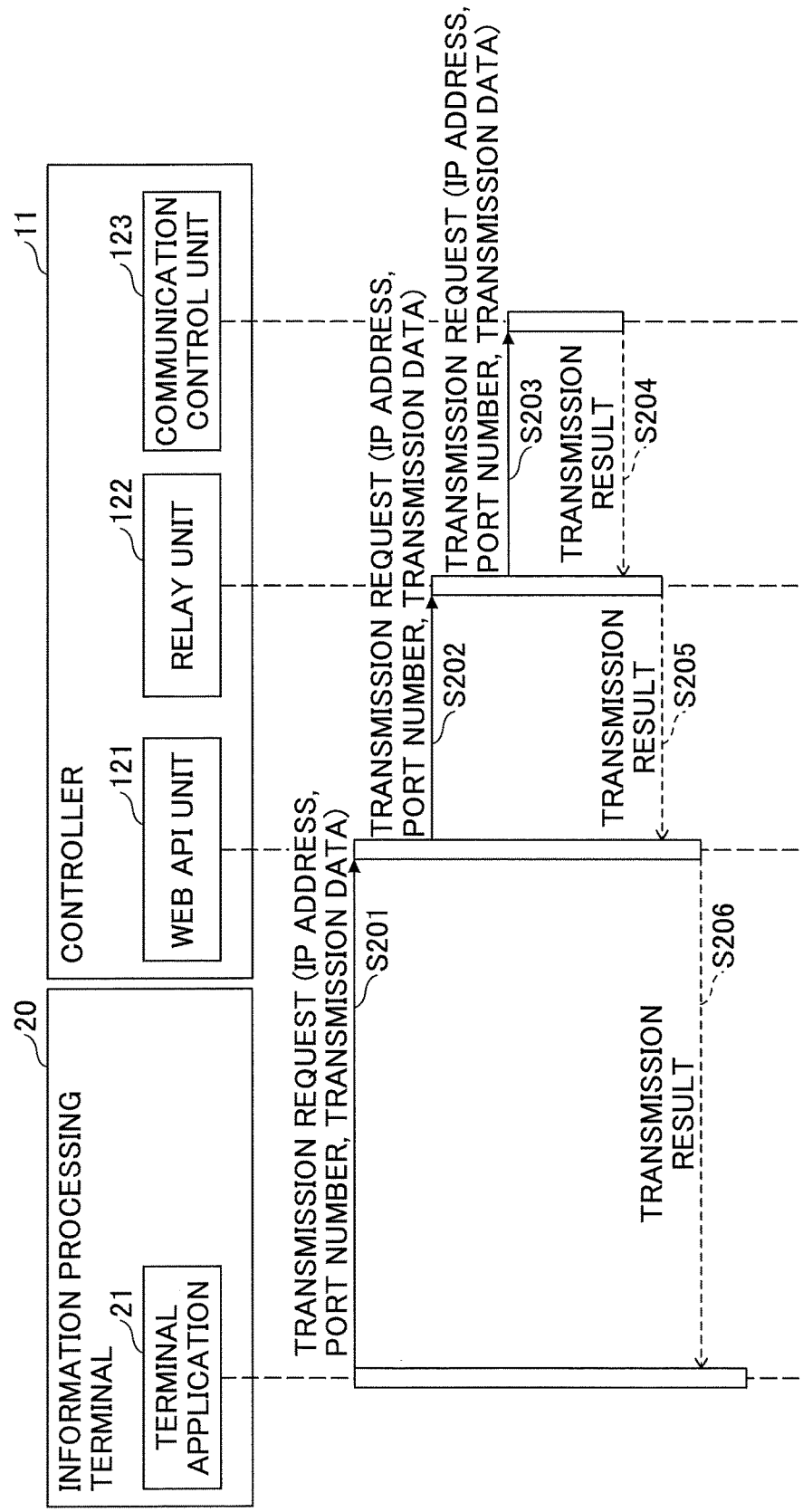
FIG. 6 is a sequence chart illustrating process operations executed by the image forming apparatus according to a second example.

As the second example embodiment of the present invention, UDP packet transmission from the information processing terminal 20 is described below. FIG. 6 is a sequence chart illustrating process operations executed by the image forming apparatus 10 according to the second example embodiment.

The terminal application 21 that seeks to transmit a UDP packet to an external device sends a transmission request including an IP address and a port number of the transmission destination and transmission data to the web API unit 121 (step S201). The web API unit 121 sends the transmission request to the relay unit 122 (step S202). In turn, the relay unit 122 requests the communication control unit 123 to transmit the transmission data included in the transmission request to the IP address and the port number included in the transmission request (step S203).

The communication control unit 123 transmits the transmission data to the IP address and the port number, and returns a transmission result indicating success or failure of the transmission to the relay unit 122 (step S204). The relay unit 122 notifies the web API unit 121 of the transmission result (step S205). The web API unit 121 transmits the transmission result to the terminal application 21 corresponding to the sender of the transmission request (step S206).

As described above, according to the second example embodiment, the terminal application 21 can transmit a UDP packet to an external device. Further, as with the first example embodiment, the terminal application 21 of the information processing terminal 20 may be able to use a communication protocol supported by the controller 11 even if the communication protocol is not supported by the information processing terminal 20.

In the following, a third example embodiment of the present invention will be described. The third example embodiment relates to a specific use scenario (use case) of using the functions implemented by the first example embodiment and the second example embodiment.

Figure 7:
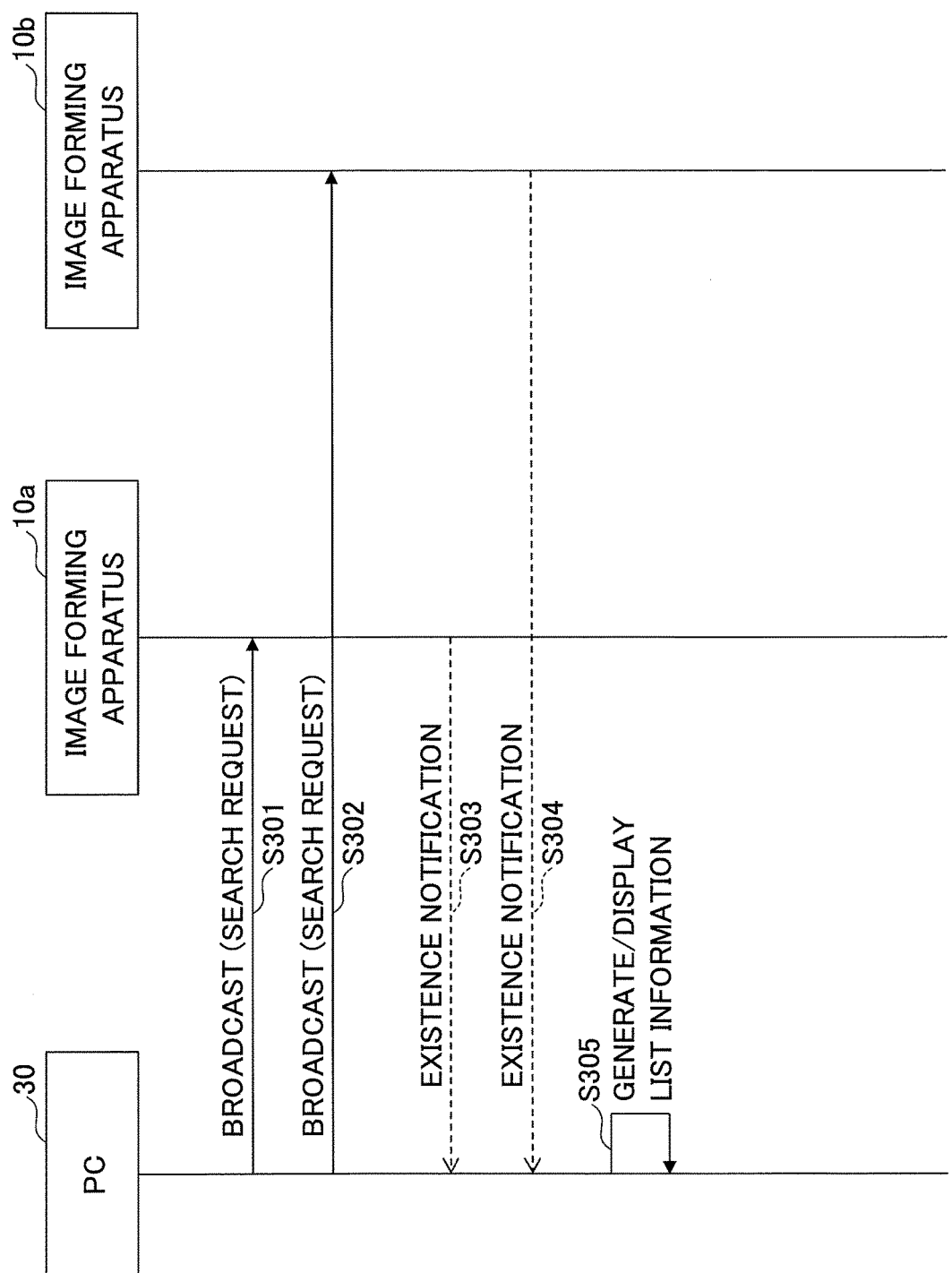
FIG. 7 is a sequence chart illustrating process operations executed by the image forming apparatus according to a third example.

FIG. 7 is a sequence chart illustrating example process operations executed by the image forming apparatus 10 according to the third example embodiment.

In the third example embodiment, the PC 30 broadcasts a UDP packet representing a search request including a port number associated with a specific terminal application 21 in order to search for (discover) the image forming apparatus 10 that has the specific terminal application 21 installed therein (steps S301 and S302).

If the specific terminal application 21 is installed in each of the image forming apparatus 10a and the image forming apparatus 10b, steps S122 to S126 of FIG. 5 are executed at each of the image forming apparatus 10a and the image forming apparatus 10b in response to receiving the UDP packet from the PC 30. Also, by executing steps S201 to S203 of FIG. 6 in response to the search request to notify the PC 30 of the existence of the specific terminal application 21, each of the image forming apparatus 10a and the image forming apparatus 10b transmits a response including a notification indicating the existence of the specific terminal application 21 to the PC 30 (steps S303 and S304).

Based on the response from each image forming apparatus 10, the PC 30 generates and displays list information of the image forming apparatuses 10 having the specific terminal application 21 installed therein (step S305).

As described above, according to the third example embodiment, data (search request) included in a UDP packet is transmitted (broadcast) to each information processing terminal 20, and each information processing terminal 20 responds to the search request. In this way, list information relating to the terminal application 21 installed in each information processing terminal 20 can be obtained using broadcasting.

In the following, a fourth example embodiment of the present invention will be described. The fourth example embodiment also relates to a specific use scenario (use case) of using the functions implemented by the first example embodiment and the second example embodiment.

FIG. 8 is a sequence chart illustrating example process operations executed by the image forming apparatus 10 according to the fourth example embodiment.

In the fourth example embodiment, it is assumed that the terminal application 21 is an application for implementing a storage/print function. The storage/print function is a function of storing a print job received from the PC 30 in the image forming apparatus 10 and executing the stored print job in response to an operation by a user with respect to the image forming apparatus 10, for example.

For example, when a print job is transmitted from the PC 30 to the image forming apparatus 10a (step S401), the print job is stored (accumulated) in the image forming apparatus 10a under control by the terminal application 21 of the image forming apparatus 10a (step S402).

Then, when the image forming apparatus 10a executes the processes of steps S201 to S203 of FIG. 6, list information of the print jobs stored in the image forming apparatus 10a is broadcast (steps S403 and S404). That is, the terminal application 21 of the image forming apparatus 10a designates the broadcasting destination address, the port number associated with the terminal application 21, and the list information of the stored print jobs in the transmission request issued in step S201 of FIG. 6.

Each of the image forming apparatus 10b and the image forming apparatus 10c that receives the broadcast job list executes the processes of steps S122 to S126 of FIG. 5. The terminal application 21 of each of the image forming apparatus 10b and the image forming apparatus 10c integrates the list information of the print jobs stored in the image forming apparatus 10a with list information of print jobs stored in its own apparatus (steps S405 and S406).

By executing the above-described process operations each time the image forming apparatus 10 receives a print job, a plurality of image forming apparatuses 10 may be able to share the print jobs received by each of these image forming apparatuses 10. As a result, for example, when printing a print job, a user can use an image forming apparatus 10 that is different from that to which the print job was transmitted.

Note that the controller 11 described above is an example of an information processing apparatus. The UDP is an example of a predetermined communication protocol. The relay unit 122 is an example process unit for implementing a process of transmitting data included in a packet. The communication control unit 123 is an example process unit for implementing processes of opening a port and closing a port.

Note that a person skilled in the field of information processing technology may implement the present invention using an application specific integrated circuit (ASIC) or an apparatus in which circuit modules are connected.

Further, each of the functions (units) described in connection with the above embodiments may be implemented by one or more circuits.

The one or more circuits described above may include a processor programmed by software to execute a corresponding function, and/or hardware, such as an ASIC or a circuit module, designed to execute a corresponding function, for example.

Although the present invention has been described above with reference to certain illustrative embodiments, the present invention is not limited to these embodiments, and numerous variations and modifications may be made without departing from the scope of the present invention.

What is claimed is:

1. An information processing apparatus including an operation unit that is implemented by an information processing terminal connected via a communication line, the information processing apparatus comprising:
   a memory storing a program; and
   a processor configured to execute the program to implement processes of
      opening a port for receiving a packet conforming to a predetermined communication protocol in response to a request from the information processing terminal;
      receiving an asynchronous event reception setting request to enable transmission of the packet to be transmitted to the information processing terminal upon receipt of the packet; and
      transmitting data included in the packet to the information processing terminal in response to receiving the packet that is directed to the port, wherein
   the request from the information processing terminal includes a relay condition for the packet, and
   the processor transmits the data included in the packet to the information processing terminal if the packet satisfies the relay condition, the relay condition being satisfied in a case where a transmission source IP address is specified from which a packet relay is permitted, a transmission source port number is specified from which the packet relay is allowed, or a predetermined value is included at a predetermined position of the data included in the packet.

2. The information processing apparatus according to claim 1, wherein
the processor receives a plurality of requests for opening a plurality of ports from the information processing terminal, each request designating a port number of the port to be opened;
the processor opens the port identified by the port number designated in each request in response to receiving the each request from the information processing terminal; and
upon receiving a packet directed to one port of the plurality of ports, the processor transmits the port number of the one port and the data included in the packet to the information processing terminal.

3. The information processing apparatus according to claim 1, wherein the processor further implements a process of closing the port in response to a close request from the information processing terminal.

4. The information processing apparatus according to claim 1, wherein the predetermined communication protocol corresponds to UDP (User Datagram Protocol).

5. The information processing apparatus according to claim 3, wherein upon completion of the port closing process, the information processing terminal
designates the port number of the closed port, and
transmits a request to the information processing apparatus to cancel the asynchronous event reception setting.

6. An information processing method executed by an information processing apparatus including an operation unit that is implemented by an information processing terminal connected via a communication line, the information processing method comprising:
opening a port for receiving a packet conforming to a predetermined communication protocol in response to a request from the information processing terminal;
receiving an asynchronous event reception setting request to enable transmission of the packet to be transmitted to the information processing terminal upon receipt of the packet; and
transmitting data included in the packet to the information processing terminal in response to receiving the packet that is directed to the port, wherein
the request from the information processing terminal includes a relay condition for the packet, and
the processor transmits the data included in the packet to the information processing terminal if the packet satisfies the relay condition, the relay condition being satisfied in a case where a transmission source IP address is specified from which a packet relay is permitted, a transmission source port number is specified from which the packet relay is allowed, or a predetermined value is included at a predetermined position of the data included in the packet.

7. The information processing method according to claim 6, further comprising:
receiving a plurality of requests for opening a plurality of ports from the information processing terminal, each request designating a port number of the port to be opened;
opening the port identified by the port number designated in each request in response to receiving the each request from the information processing terminal; and
upon receiving a packet directed to one port of the plurality of ports, transmitting the port number of the one port and the data included in the packet to the information processing terminal.

8. The information processing method according to claim 6, further comprising:
closing the port in response to a close request from the information processing terminal.

9. The information processing method according to claim 6, wherein the predetermined communication protocol corresponds to UDP (User Datagram Protocol).

10. The information processing method according to claim 8, wherein upon completion of closing the port, the information processing terminal executes processes of
designating the port number of the closed port, and
transmitting a request to the information processing apparatus to cancel the asynchronous event reception setting.

11. A non-transitory computer program product, including computer-executable instructions to be executed by an information processing apparatus including an operation unit that is implemented by an information processing terminal connected via a communication line, the computer-executable instructions, when executed, causing the information processing apparatus to implement processes of:
opening a port for receiving a packet conforming to a predetermined communication protocol in response to a request from the information processing terminal;
receiving an asynchronous event reception setting request to enable transmission of the packet to be transmitted to the information processing terminal upon receipt of the packet; and
transmitting data included in the packet to the information processing terminal in response to receiving the packet that is directed to the port, wherein
the request from the information processing terminal includes a relay condition for the packet, and
the processor transmits the data included in the packet to the information processing terminal if the packet satisfies the relay condition, the relay condition being satisfied in a case where a transmission source IP address is specified from which a packet relay is permitted, a transmission source port number is specified from which the packet relay is allowed, or a predetermined value is included at a predetermined position of the data included in the packet.

12. The non-transitory computer program product according to claim 11, wherein the computer-executable instructions further causes the information processing apparatus to implement processes of
receiving a plurality of requests for opening a plurality of ports from the information processing terminal, each request designating a port number of the port to be opened;
opening the port identified by the port number designated in each request in response to receiving the each request from the information processing terminal; and
upon receiving a packet directed to one port of the plurality of ports, transmitting the port number of the one port and the data included in the packet to the information processing terminal.

13. The non-transitory computer program product according to claim 11, wherein the computer-executable instructions further causes the information processing apparatus to implement a process of closing the port in response to a close request from the information processing terminal.

14. The non-transitory computer program product according to claim 11, wherein the predetermined communication protocol corresponds to UDP (User Datagram Protocol).

15. The non-transitory computer program product according to claim 13, wherein upon completion of the port closing process, the information processing terminal designates the port number of the closed port, and transmits a request to the information processing apparatus to cancel the asynchronous event reception setting.

* * * * *